(12) United States Patent
Pavlik et al.

(10) Patent No.: US 6,225,000 B1
(45) Date of Patent: May 1, 2001

(54) ELECTRIC VEHICLE BATTERY POST CAP

(75) Inventors: Joseph Michael Pavlik, Clinton Township; Philip Michael Gonzales, Dearborn, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/092,184

(22) Filed: Jun. 5, 1998

(51) Int. Cl.⁷ ................................................. H01M 2/02
(52) U.S. Cl. ........................................ 429/181; 429/175
(58) Field of Search ................................ 429/7.21, 175, 429/181; 439/761–66

(56) References Cited

U.S. PATENT DOCUMENTS

| | | |
|---|---|---|
| 4,118,097 | 10/1978 | Budnick . |
| 4,932,896 | 6/1990 | Julian . |
| 5,169,338 | 12/1992 | Dewar et al. . |
| 5,338,898 | 8/1994 | Luciano et al. . |
| 5,346,407 * | 9/1994 | Hood ................................... 439/147 |
| 5,346,782 | 9/1994 | Julian . |
| 5,576,516 | 11/1996 | Kameyama et al. . |

* cited by examiner

Primary Examiner—Carol Chaney
Assistant Examiner—Mark Ruthkosky
(74) Attorney, Agent, or Firm—David B. Kelley

(57) ABSTRACT

An insulated battery connector cap includes a body molded over a connector end of a battery cable and a cap resiliently attached thereto, the cap being operable between a capped state where the cap engages the body and an uncapped state where the cap is disengaged from the body although in contacting relationship with the body and substantially covering the battery post thereby.

7 Claims, 2 Drawing Sheets

ELECTRIC VEHICLE BATTERY POST CAP

FIELD OF THE INVENTION

The present invention relates to an electric vehicle battery post cap, and more specifically, to a cap that protects the vehicle battery from short circuiting.

BACKGROUND OF THE INVENTION

Conventional automotive vehicle battery post caps are used to protect battery posts from corrosive elements caused by acidic fumes given off by the battery that builds up on or between the posts. There are several known methods by which the battery posts are capped and thus protected.

One method comprises a dielectric block for encasing the conductive portions of the terminals and cable connectors, thereby insulating the battery from corrosive elements. The cover further comprises a conductive sleeve extending outwardly from the dielectric block to provide a location for attaching cables when jump starting the motor vehicle.

Another method is a sealed surface cover that encloses the top portion of the battery and includes a terminal cover that extends from the surface cover to create an overhang above the positive and negative terminals. These battery covers, however, make accessing the battery, and more specifically the battery posts, difficult.

In order to facilitate access to the battery and battery posts, caps have been developed that cover the battery post only. These battery post caps utilize a flexible, rubber boot that slideably receives a battery cable therethrough and lays over the post and cable connector. These flexible rubber caps, however, have a tendency to dislodge from the post when the vehicle is in operation because they simply rest on top of the post.

To remedy the dislodging problem caps have been developed that lock shut over the post and must be manually removed to gain access to the post. Some caps have to be manually removed and set aside when gaining access to the post is desired. Other caps are joined to the connector with typically a hinged arrangement whereby the cap is manually tilted back when access to the post is desired. These locking caps, however, leave the battery post exposed when the cap is in an unlocked position.

With the advent of the electric vehicle, leaving the battery post exposed when the cap is disengaged is disadvantageous due to the high power of the conventional batteries used in such vehicles. More specifically, if the post is inadvertently bridged with a conductive tool while the cap is disengaged from the post, the battery could short circuit, and the cable could be damaged.

What is desired, therefore, is a battery post cap that electrically insulates the battery post, remains locked shut over the post in a capped state, and in an uncapped state substantially covers the post thereby preventing the inadvertent contact of a conductive tool with the post.

SUMMARY OF THE INVENTION

Responsive to the deficiencies in the prior art, the present invention provides an insulated battery connector cap having a body molded over a connector end of a battery cable. The body has a cylindrical portion with an aperture therethrough for receiving a battery post therein. The cylindrical portion has an annular ring extending therearound. A cap resiliently attached to the body has an annular groove adapted to receive the annular ring. The cap is operable between a capped state where the groove engages the ring and an uncapped state where the groove is disengaged from the ring and the cap is in contacting relationship with the cylindrical portion substantially covering the battery post thereby.

In a preferred embodiment of the present invention the resilient attachment allows the cap to be manually positioned out of contact with the cylindrical portion, thereby exposing the battery post, and to return the cap to the uncapped state upon manual release of the cap.

An object of the present invention is to provide an electric vehicle battery post cap that minimizes the chance of an electrically conductive tool coming in to contact with the battery post.

An advantage of the present battery cap is that it is resiliently biased to remain in a post-covering position whether in a capped or uncapped state. Further, the resilient attachment of the cap to the body allows the cap to be manually moved aside when access to the battery post is desired.

BRIEF DESCRIPTION OF THE DRAWINGS

Other features and advantages of the present invention will become apparent to those skilled in the automotive vehicle related arts upon reading the following description with reference to the accompanying drawings, in which.

DETAILED DESCRIPTION OF THE PREFERRED EMBODIMENT

Figure 1:
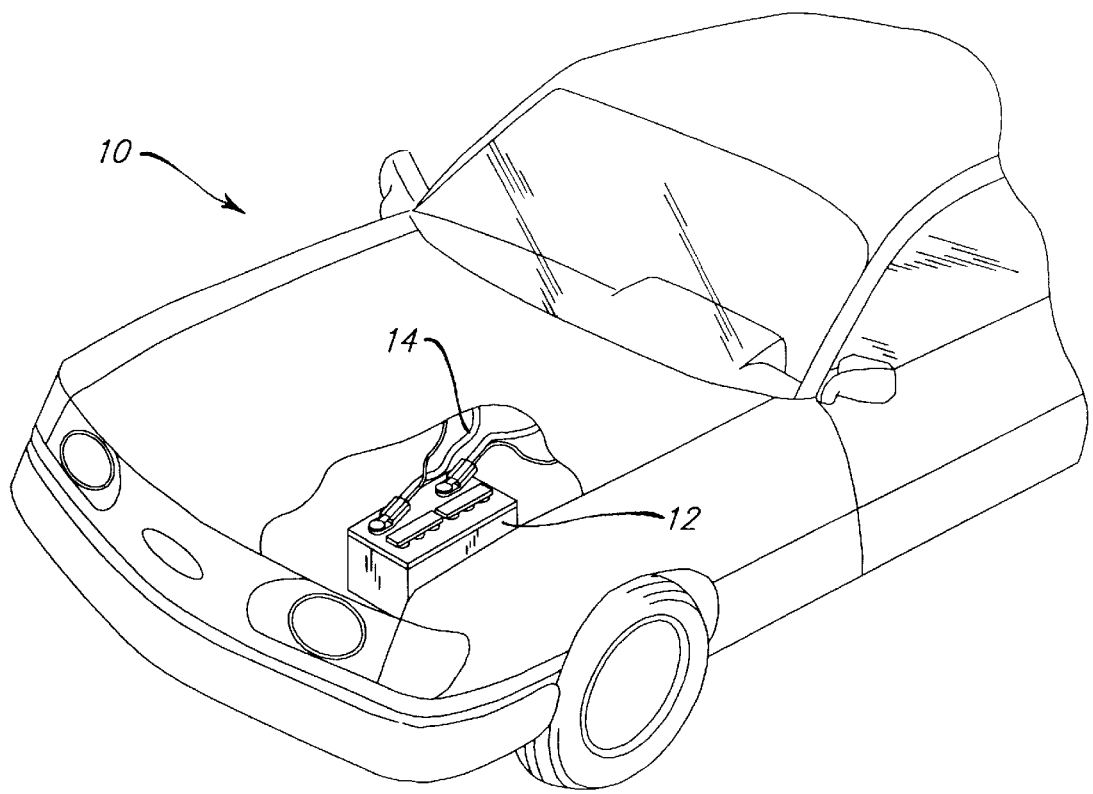
FIG. 1 is a perspective view of an automotive vehicle with a battery and battery connector cables according to the present invention.
Figure 2:
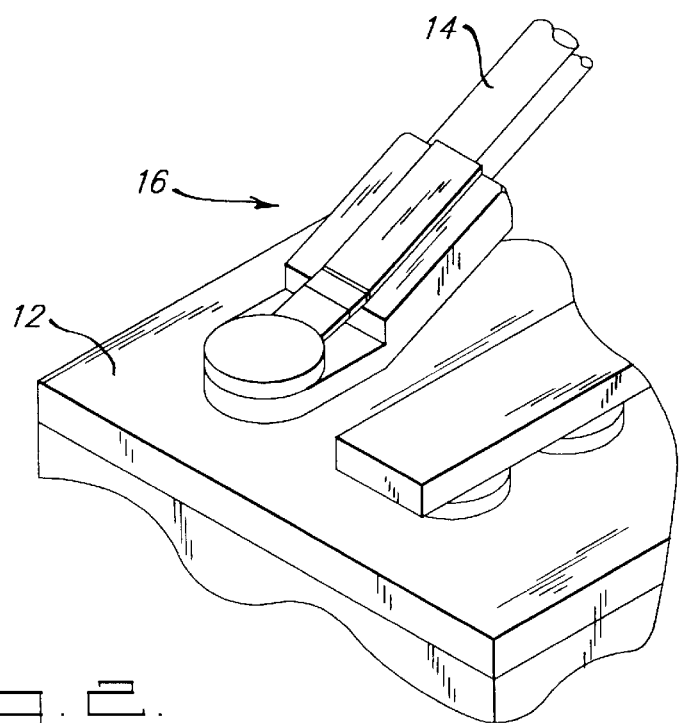
FIG. 2 is a perspective view of a battery cable having a battery post cap according to the present invention.

Turning now to the drawings, and in particular to FIG. 1 thereof, an automotive vehicle 10 is shown having a battery 12 with battery cables 14 attached thereto. As shown in FIG. 2, the battery cable 14 has an insulated connector 16 molded thereover to provide a sealed connection between the cable 14 and the battery 12. As known in the art, insulated connectors 16 comprise a flat conductive plate suitably attached to a multi-strand wire core of the cable, e.g. by crimping soldering and/or brazing.

Figure 3:
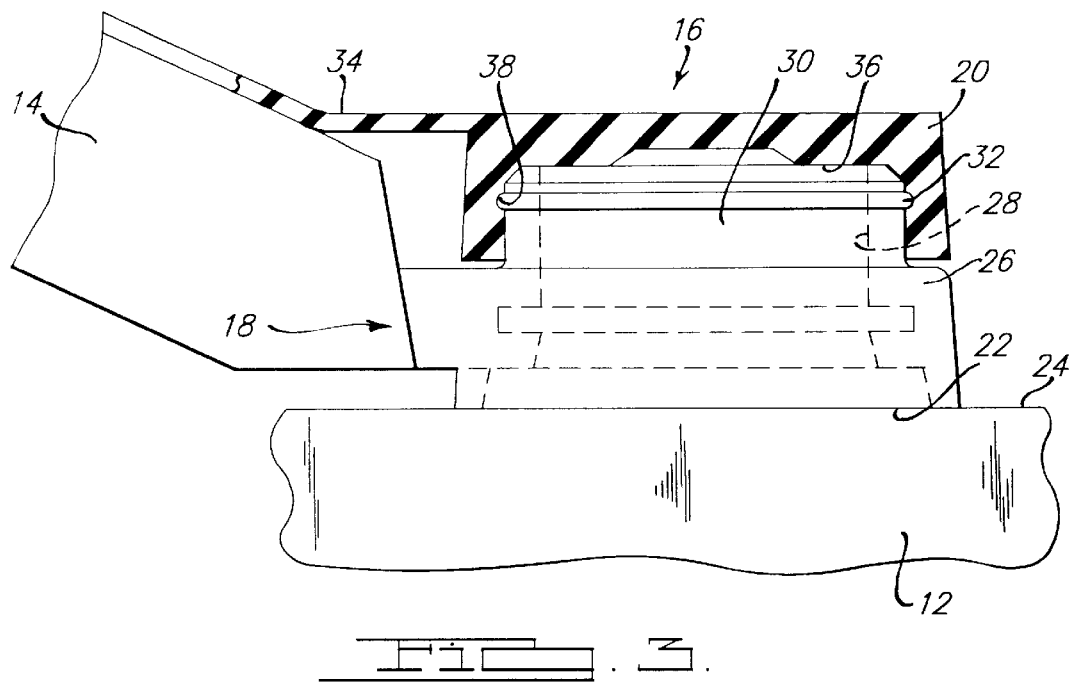
FIG. 3 is a side, cut away view of a battery cable with a post cap in a capped state according to the present invention.
Figure 4:
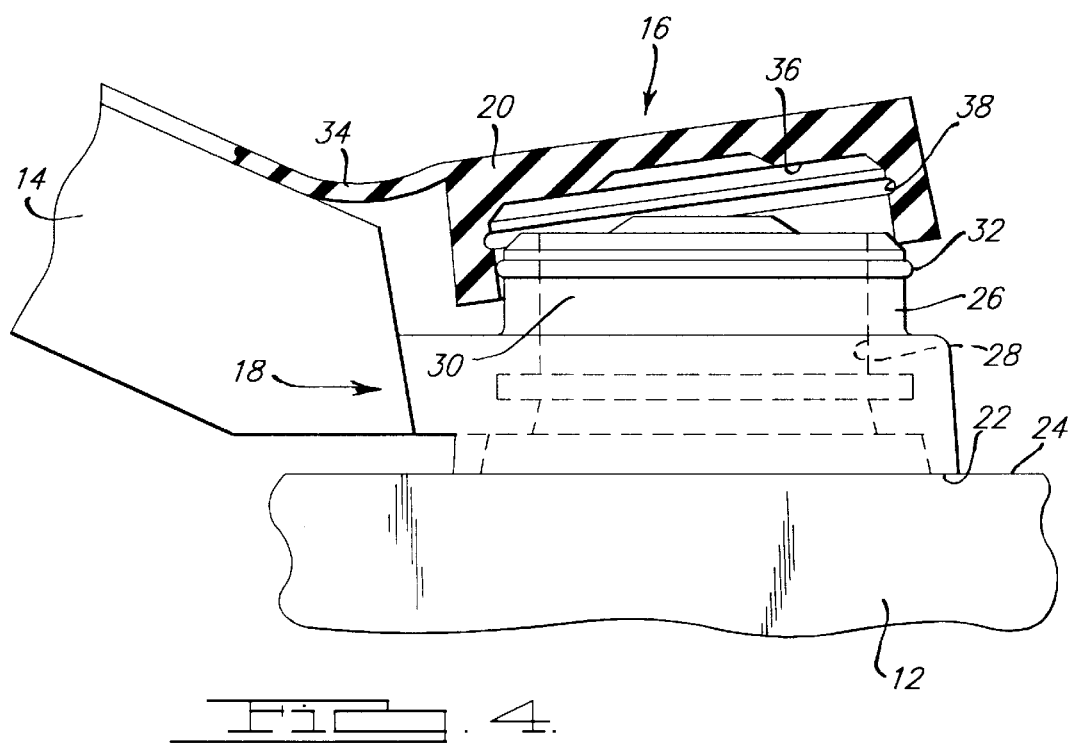
FIG. 4 is a side, cut away view of battery cable with a post cap in an uncapped state according to the present invention.

As shown in FIGS. 3 and 4, the insulated connector 16 has a body 18 and a cap 20. The body 18 has a substantially planar base 22 adapted to lay flat on an upper surface 24 of the battery 12. The body 18 further has a cylindrical portion 26 with an aperture 28 therethrough. The aperture 28 is adapted to receive a battery post 30 therein. The cylindrical portion 26 further has an annular ring 32 extending therearound.

As further shown in FIGS. 3 and 4, the cap 20 is preferably integrally formed with the body 18 and resiliently extends therefrom. The resilient extension is preferably a rubberized living hinge 34 made of polyvinyl chloride. The cap 20 has an inner surface 36 having an annular groove 38 adapted to receive the annular ring 32.

In use, the connector 16 is placed over the battery post 30 via the aperture 28. The cap 20 is placed in a capped state by securing the cap 20 over the cylindrical portion 26. This is accomplished by bringing the annular groove 38 in to contact with the annular ring 32. In the capped state the battery post 30 is protected against exposure to the ambient atmosphere. The cap 20 is placed in an uncapped state by pealing the cap 20 back until the annular groove 38 clears the annular ring 32. In the uncapped state, the hinge 34 biases the cap 20 in a contacting and substantially covering relationship with the cylindrical portion 26. In other words, the cylindrical portion 26, and the battery post 30 thereby, is always covered whether the cap 20 is in a capped or uncapped state. In order to gain access to the battery post 30, the cap 20 must be manually moved away from the cylindrical portion 26. The living hinge 34 facilitates such a function. Once the cap 20 is manually released, the cap 20 returns to the biased, battery post covering position.

The present invention is advantageous in that the cap 20 is resiliently biased to remain in a battery post covering position whether in a capped or uncapped state. More specifically, inadvertent contact of a conductive tool with the post 30 is thusly prevented. Further, the resilient attachment of the cap 20 to the body 18 allows the cap 20 to be manually moved aside when access to the battery post 30 is desired.

Only one embodiment of the vehicle battery post cap of the present invention has been described. Those skilled in the automotive arts will appreciate that others may be possible without departing from the scope of the following claims.

We claim:

1. An insulated battery connector cap, comprising:
   a body molded over a connector end of a battery cable, the body having a substantially planar base adapted to lay flat on an upper surface of a battery and a cylindrical portion extending axially from the base with an aperture therethrough for receiving a battery post therein, the cylindrical portion having an annular ring extending around an outer periphery thereof and spaced axially from the base; and
   a cap resiliently attached to the body having an annular groove adapted to receive the annular ring, the cap operable between a capped state where the annular groove engages the annular ring and an uncapped state where the annular groove is disengaged from the annular ring and the cap is in a contacting relationship with the cylindrical portion, substantially covering the battery post thereby.

2. An insulated battery connector cap according to claim 1, wherein:
   the cap resiliently attached to the body is by means of a rubberized living hinge adapted to allow the cap to be manually positioned out of contact with the cylindrical portion, thereby exposing the battery post, and to return the cap to the uncapped state upon manual release of the cap.

3. An insulated battery connector cap according to claim 2, wherein the rubberized living hinge is made of polyvinyl chloride.

4. An insulated battery connector cap, comprising:
   a body molded over a connector end of a battery cable, the body having a substantially planar base adapted to lay flat on an upper surface of a battery and a cylindrical portion extending axially from the base with an aperture therethrough for receiving a battery post therein, the cylindrical portion having an annular ring extending around an outer periphery thereof and spaced axially from the base; and
   a cap resiliently attached to the body having an annular groove therein adapted to engage the annular ring, the cap operable between a capped state where the annular groove engages the annular ring and an uncapped state where the annular groove is disengaged from the annular ring and the cap is in a battery post covering position.

5. An insulated battery connector cap according to claim 4, wherein:
   the cap resiliently attached to the body is by means of a rubberized living hinge adapted to allow the cap to be manually positioned out of contact with the cylindrical portion, thereby exposing the battery post, and to return the cap to the uncapped state upon manual release of the cap.

6. An insulated battery connector cap according to claim 5, wherein the rubberized living hinge is a polyvinyl chloride living hinge.

7. An insulated battery connector cap, comprising:
   a body molded over a connector end of a battery cable, the body having a substantially planar base adapted to lay flat on an upper surface of a battery and a cylindrical portion extending axially from the base with an aperture therethrough for receiving a battery post therein, the cylindrical portion having an annular ring extending around an outer periphery thereof and spaced axially from the base;
   a cap resiliently attached to the body having an annular groove adapted to receive the annular ring, the cap operable between a capped state where the annular groove engages the annular ring and an uncapped state where the annular groove is disengaged from the annular ring and the cap is in contacting relationship with the cylindrical portion, substantially covering the battery post thereby; and
   the resilient attachment adapted to allow the cap to be manually positioned out of contact with the cylindrical portion, thereby exposing the battery post, and to return the cap to the uncapped state upon manual release of the cap.

* * * * *